Sept. 6, 1949.  H. J. OGORZALY  2,481,439
GAS-SOLIDS CONTACTING APPARATUS INCLUDING
MEANS FOR STRIPPING SOLID PARTICLES
Filed Aug. 7, 1945  3 Sheets-Sheet 3

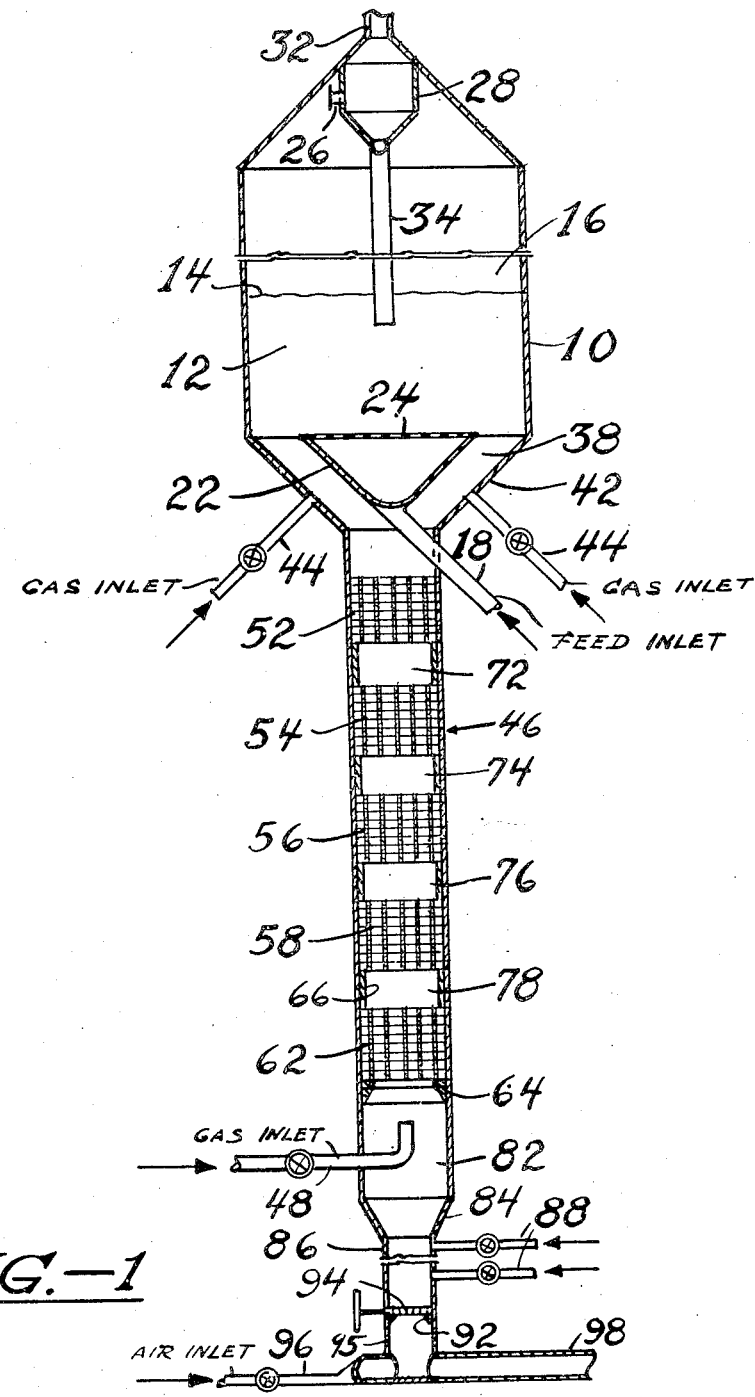

Henry J. Ogorzaly Inventor
By P. K. Young Attorney

Patented Sept. 6, 1949

2,481,439

UNITED STATES PATENT OFFICE 2,481,439

GAS-SOLIDS CONTACTING APPARATUS INCLUDING MEANS FOR STRIPPING SOLID PARTICLES

Henry J. Ogorzaly, Summit, N. J., assignor to Standard Oil Development Company, a corporation of Delaware Application August 7, 1945, Serial No. 609,461

3 Claims. (Cl. 23—288)

This invention relates to stripping finely divided solid material for removing or recovering gases or vapors entrained by the solid particles on removal from a contacting zone, and more particularly, relates to the removal of gaseous or vaporous hydrocarbon reaction products from admixture with fluidized catalyst particles withdrawn in a dense fluidized condition from a reaction zone used for the catalytic conversion of hydrocarbons.

In many operations when contact or catalyst material in divided form, especially adsorbent material, is removed from a contacting zone for regeneration or other reasons, gases and/or vapors are present between the particles and are removed with the solid particles. If the solid particles are to be regenerated by burning, it is best practice to strip the solid particles to remove and/or recover the vaporous entrained products before the regeneration step so that the burden on the regeneration zone is less.

In the newer type of catalytic conversion units where catalyst or contact particles are removed in a dense fluidized condition, it has been extremely difficult to obtain efficient stripping of the vapors or gases between the contact particles. In some previous stripping vessels there has not been proper dispersion of the solid particles in the stripping gas and there has also been undesirable circulation of solid particles in the stripping vessel. In the present type of stripping vessel, the solid particles to be stripped move downwardly through the stripping zone countercurrent to the upflowing stripping gas.

It is preferred to have a long narrow stripping zone or vessel instead of a short wide stripping vessel for efficient stripping, but with such long stripping zones or vessels it is expensive to build high structures. To get substantially the same result the stripping vessel can be subdivided into a plurality of narrow elongated parallel cells. Under some conditions with such cellular strippers there is channeling of the upflowing gas through the downflowing solid particles to be stripped and improper or inefficient stripping is obtained.

According to my invention, the stripping zone or vessel is provided with a number of cellular cartridges or inserts occupying the greater part of its length and the cartridges or inserts are spaced apart for relatively short distances to provide unobstructed spaces for redistribution of the solid particles in the stripping gas. In this way, channelling of the catalyst and gas streams in such a manner as to permit any portion of the catalyst stream to by-pass the stripping zone is effectively prevented.

The cellular cartridges or inserts are fabricated from subway grating or similar lattice work or open mesh construction of honey-comb cross-section. The cartridges or inserts may be made integrally or as one piece, but it is cheaper to assemble and align a plurality of shallow sections one on top of the other and weld the sections together to form the cellular cartridge.

The solid particles in dense fluidized condition are introduced into the upper portion of the stripping vessel and flow downwardly countercurrent to the stripping gas passing upwardly through the stripping vessel or zone. The stripping gas is introduced into the bottom portion of the stripping vessel or zone. As the solid particles flow down the narrow long passages in the cellular cartridges or inserts, they are intimately contacted with the upflowing stripping gas and efficient stripping is obtained.

The solid particles then flow into a small unobstructed space between adjacent cellular cartridges where the solid particles are mixed with the upflowing stripping gas and the particles are redistributed in the stripping gas as a dense fluidized turbulent mixture before the particles are passed down to the next cellular cartridge. The stripping zone may consist of any desired number of such cellular cartridges and intervening redistributing zones in series arrangement.

The cellular cartridges or inserts form the major part of the length of the stripping vessel or zone and the unobstructed spaces between the cartridges or inserts form only a minor part of the length of the stripping vessel or zone. Each unobstructed space between the adjacent faces of the cellular cartridges or inserts is preferably less than the length of the individual cellular cartridge and preferably each unobstructed space between adjacent faces of the cellular cartridges or inserts is not greater than about one-half the length of the individual cartridge or insert. The elongated cells of the spaced cartridges give a high ratio of length of cell to diameter of cell and efficient stripping is obtained when the ratio of length to diameter is large.

The unobstructed spaces between the cellular cartridges or inserts are only provided to prevent any tendency of the stripping gas to channel through the stripping vessel or zone. Such unobstructed spaces between the cellular cartridges or inserts are used to redistribute the solid particles and the stripping gas by forming a dense fluidized turbulent mixture before the solid particles are introduced into the next lower cellular cartridge or insert and before the stripping gas rises into the next higher cartridge. A minimum total length of such unobstructed spaces is to be used, however, because the stripping effect in the elongated cells is superior to the stripping efficiency in the unobstructed spaces.

My stripping vessel or zone may be provided as a stripping vessel depending from the bottom portion of a reaction vessel, as a separate stripping vessel, or as an annular stripping zone or section arranged in the bottom part of the reaction vessel and surrounding the inlet conical member arranged in the bottom portion of the reaction vessel and having a circular distribution grid plate.

In the drawings:

Fig. 1 represents a longitudinal vertical cross-section of one form of my invention;

Figure 3:
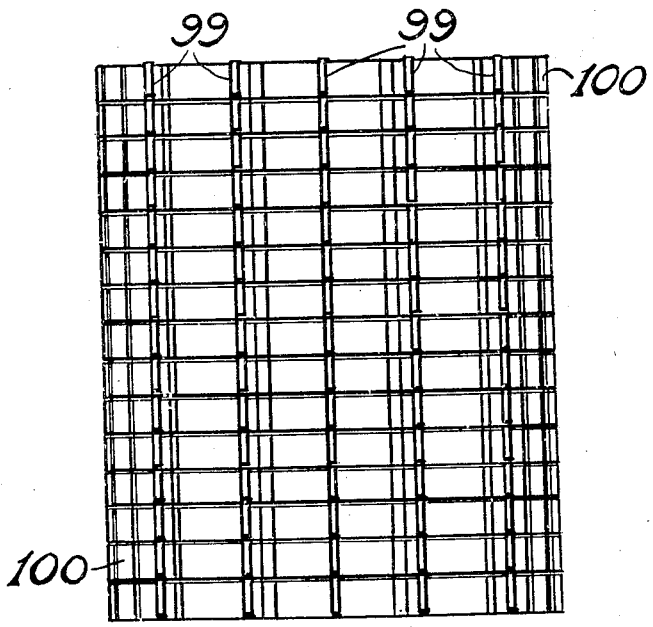
Fig. 3 represents a front elevation of the cellular cartridge or insert used in the construction shown in Fig. 1.

Referring now to the drawing, and more particularly to Fig. 1, the reference character 10 designates a reaction vessel containing finely divided solid material in a dense fluidized condition shown at 12 with a level 14. The velocity of the gaseous fluid passing upwardly through the reaction vessel is selected to maintain the solid particles in a dense fluidized liquid-simulating condition.

Above the level 14 of the dense fluidized mixture is a dilute or dispersed phase 16 which comprises a dilute suspension of solid particles in gaseous fluid.

A feed line 18 is provided for the reaction vessel 10 for introducing reactants and solid particles into the reaction vessel 12. The reactants and solid particles may be introduced as a mixture or they may be introduced separately into the reaction vessel 12.

The reactants may be in vaporous or gaseous form. If the reactants are introduced in a liquid form, a sufficient amount of hot contact particles must be used to vaporize the liquid reactants and to supply the heat of reaction which may be necessary. In the catalytic cracking of liquid hydrocarbons, the hot regenerated catalyst particles are at a higher temperature than the cracking temperature and a relatively large amount of catalyst particles is used to vaporize the liquid hydrocarbons and to supply the heat of cracking.

In the catalytic conversion of hydrocarbons, the temperature in the reaction zone 10 may be between about 800° F. and 1200° F. For the catalytic cracking of relatively heavy hydrocarbons, such as gas oil, the temperature in the reaction zone is preferably between about 850° F. and 1000° F. The ratio of catalyst to oil may vary between about 5 parts of catalyst by weight to one part of oil by weight to 30 parts of catalyst by weight to one part of oil by weight.

For catalytic cracking, the catalyst may be acid-treated bentonite clay, synthetic silica alumina gel, synthetic silica magnesia gel, etc. For other catalytic conversions of hydrocarbons any suitable catalyst may be used.

The catalyst or contact particles are preferably in a powdered condition having a particle size between about 200 and 400 standard mesh or finer with up to 40% of 0 to 20 micron material. Coarser catalyst or contact particles may be used, if desired. For maintaining the powdered contact particles in a fluidized liquid-simulating condition, the superficial velocity may vary between about 0.5 ft./second and 2 ft./second. The superficial velocity is that velocity of the gas passing through the vessel 10 with no contact particles present in the vessel. With such velocities, the powdered material has a density of between about 10 lbs./cu. ft. and 35 lbs./cu. ft.

The vaporous reaction products in the dilute suspension or dilute phase 16 contain entrained contact or catalyst particles and the vaporous reaction products are passed through an opening 26 in a cyclone separator 28 where the solid particles are separated from the vaporous products. The cyclone separator 28 is shown as arranged in the upper portion of the reaction vessel 10. If desired, other separating means may be used and more than one separating means may be used in series or parallel. Also, if desired, the separating means may be arranged outside of the reaction vessel 10.

In the separating means 28 a large part of the entrained solid particles is removed from the vaporous products and the solid particles are collected in the bottom of the hopper of the separating means. The vapors pass overhead through line 32 and are further treated to recover desired products. In the catalytic conversion of hydrocarbons, the vaporous reaction products are passed to fractionating equipment to recover the residual catalyst in the vapors and also to separate the reaction products into desired products or fractions including motor fuel or aviation gasoline.

The solid particles collecting in the separating means 29 are passed through dip pipe or leg 34 and returned to the dense bed or mixture 12 in the reaction vessel 10.

During the catalytic conversion of the hydrocarbons or other material, the contact or catalyst particles become fouled with combustible material and the particles must be regenerated before they are further used in a conversion or cracking operation. The solid particles removed from the reaction vessel 10 contain entrained or adsorbed vapors and the particles are first stripped before being passed to a regeneration zone.

In the form of the invention shown in Fig. 1, the contaminated catalyst or contact particles are withdrawn from the bottom portion of the dense bed or mixture 12 in the reaction vessel 10 and passed into the upper portion of passageway 38 which is arranged between the conical inlet member 22 and the conical bottom portion 42 of the reaction vessel 10.

The mixture of contact particles and reactants passing through the inlet line 18 is introduced into a conical inlet member 22 arranged in the bottom portion of the reaction vessel 10. The conical inlet member 22 is provided in its upper portion with a horizontal circular distribution plate 24 concentric with the reaction vessel 10.

In passing through the passageway 38, the solid particles are maintained in a fluidized condition by the introduction of a fluidizing gas through one or more lines 44 which extend through the bottom portion of the reaction vessel 10. Some stripping may take place in passageway 38. From the passageway 38 the dense fluidized fouled contact or catalyst particles are introduced into the upper portion of a stripping zone or vessel 46.

The stripping zone or vessel is shown as a vertical cylindrical vessel communicating at its upper end with the bottom portion of the reaction vessel 10 but the vessel 46 may take other forms, that is, the cross-section may be square, rectangular, elliptical, etc. Stripping gas, such as steam or other inert gas, is introduced into the bottom of the stripping vessel or section 46 through one or more lines 48.

Figure 2:
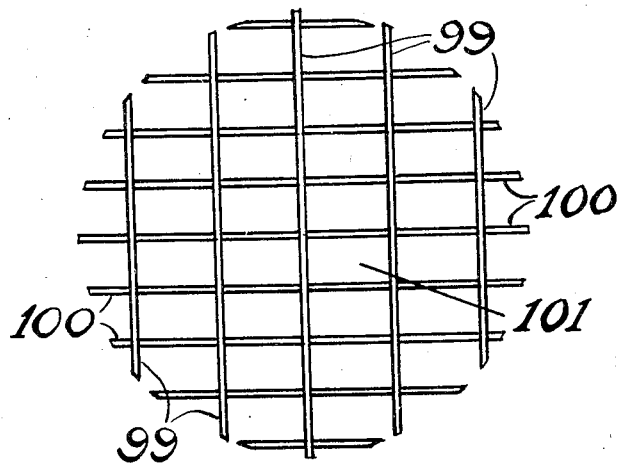
Fig. 2 represents a top plan view of one of the cellular cartridges or inserts used in the construction shown in Fig. 1.

The stripping vessel 46 is provided with spaced cellular cartridges or inserts which are arranged one above the other in spaced relation. As shown in Figs. 1, 2 and 3, the cellular cartridges are made up of strips or bars of metal arranged in crisscrossed relation to form an open mesh grating section, several of said grating sections being stacked as a unit with their openings in aligned relationship to form vertical cells or passages through the cartridges or inserts. Each cartridge or insert may be made in one piece but preferably each cartridge or insert is made by stacking a number of shallow honey-comb sections, such as, for example, subway grating sections, one above the other and with the openings in alignment, then welding the separate sections one to the other in aligned relation to form continuous vertical cells through the cartridges or inserts. The sections are welded in any suitable manner as, for example, by welding the outer cartridges together at a plurality of points.

These spaced cellular cartridges or inserts are shown at 52, 54, 56, 58 and 62 in Fig. 1. The bottom cartridge or insert 62 is supported on ledge 64 which may be a continuous annular ledge or may be formed of spaced ledges or projections for supporting the bottom cartridge or insert 62. Resting on the upper face of the bottom cartridge or insert 62 is a separating member 66 which may be in the form of a sleeve for spacing the next higher cartridge 58 from the lowest cartridge 62 while at the same time supporting the next higher cartridge 58. While the cartridges are shown as being of the same length in the drawing and this is the preferred form, it is to be understood that they need not all be the same length.

The other or higher cartridges or inserts are arranged in spaced relation by similar spacing means and supported one above the other in the same way as described in connection with the cartridge or insert 58. Instead of using the spacer members 66, the lower face of each cartridge or insert may be provided with pins or legs which rest on the upper face of the next lower cartridge or insert to space the cartridges or inserts and at the same time support them in spaced relation in the stripping vessel 46.

In addition to line 48, stripping gas may be introduced below one or more of the other cartridges 58, 56, 54 and 52.

The spaces between the cartridges or inserts from the top to the bottom are designated, respectively, by the reference characters 72, 74, 76 and 78. The space 82 is below the bottom cellular cartridge or insert 62. The spaces 72, 74, 76 and 78 form only a small portion of the length of the stripping vessel or section 46. The major part of the stripping vessel or section 46 is taken up by the cellular cartridges or inserts. While the spaces 72, etc. are shown as being of the same size, which is preferred, the spaces may be of different sizes.

From an inspection of Fig. 1, it will be seen that each of the spaces between the cartridges is about half the length of each cartridge. According to my invention, the most efficient stripping is obtained by having a plurality of long narrow passageways and having the stripping gas pass upwardly countercurrent to the downflowing particles to be stripped. In passing through the cells the solid particles are also maintained in a dense fluidized condition but the density is slightly less than in the unobstructed spaces. The long passageways in the cellular cartridges provide regions where efficient stripping is carried out.

The spaces between the cellular cartridges are short and unobstructed, and in passing through these unobstructed spaces, the solid contact particles are mixed with stripping gas issuing from a plurality of passageways to form a substantially uniform dense turbulent fluidized mixture between the cartridges. In this way, the solid particles are redistributed in the stripping gas before the solid particles are passed down through the next lower cellular cartridge or insert; and similarly the unobstructed spaces prevent channeling of the stripping gas in passing upwardly through the stripping vessel or section 46.

The stripped fouled catalyst or contact particles pass down through space 82 and tapering portion 84 into the upper part of a standpipe 86 provided with fluidizing gas lines 88 to maintain the solid particles in fluidized condition in the standpipe 86 so that the particles exert a hydrostatic pressure at the base of the standpipe. The lower portion of the standpipe 86 is provided with a valve seat 92 and a slide valve 94 for controlling the size of the valve opening and for controlling the rate of withdrawal of solid particles from the standpipe 86.

The stripped contaminated particles are withdrawn from the base of the standpipe 86 and passed to line 95 where they are mixed with a regenerating gas, such as air introduced through line 96, and this less dense mixture is passed through line 98 under the developed hydrostatic pressure to a regeneration zone (not shown) for regenerating the solid particles. From the regeneration zone the hot regenerated catalyst or contact particles are returned to the reaction vessel 10 through line 18.

In withdrawing the hot regenerated catalyst particles from the regenerator, there may be some entrained or adsorbed oxygen passing out with the hot regenerated catalyst or contact particles. In some cases it may be desirable to strip the hot regenerated catalyst or contact particles to remove such adsorbed or entrained oxygen. For such stripping, the stripping apparatus shown in Fig. 1 may be used and the hot regenerated catalyst particles passed downwardly through the stripping zone provided with spaced cellular cartridges or inserts countercurrent to the upflowing stripping gas which may be any inert gas, such as steam, flue gas free of oxygen, etc.

Figure 4:
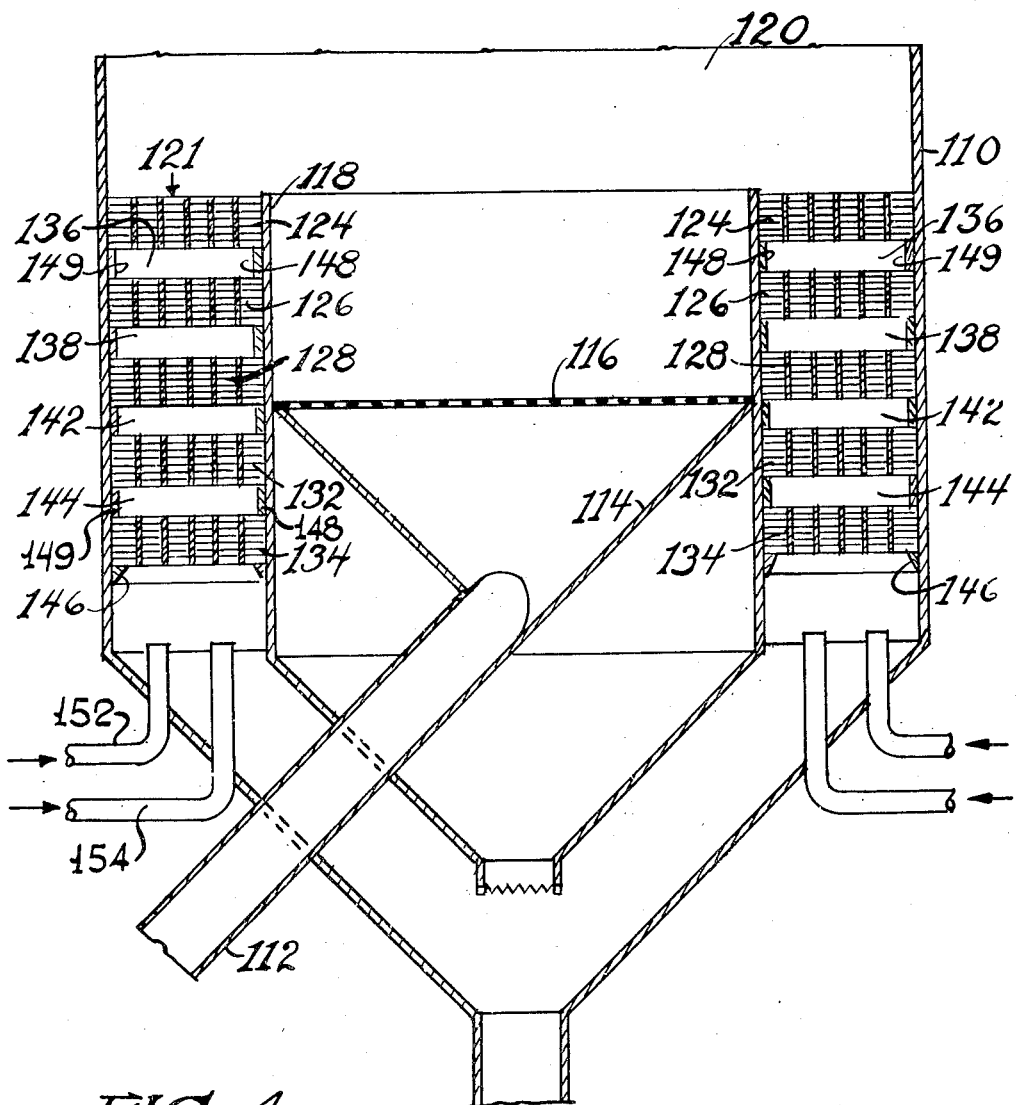
Fig. 4 represents a longitudinal vertical cross-section taken through the lower portion of a reaction vessel provided with an annular stripping section.

While I have shown a certain number of cartridges 52, etc., in Figs. 1 and 4, it is to be understood that this is for illustration only and the number of cartridges may be changed as desired.

In Fig. 2 there is shown a top plan view of the cylindrical cellular cartridge or insert used in the stripping vessel 46 shown in Fig. 1. In the particular arrangement of the cross pieces in Fig. 2 and due to the circular shape, it will be seen that openings are provided which are not all of the same size. It will be also noticed that the spaced parallel cross pieces 99 arranged in one direction are less in number than the cross pieces 100 arranged at right angles to cross pieces 99. The central cross piece in each group is the longest cross piece in each group. It is within the contemplation of my invention to vary the construction and depth of the cylindrical cellular cartridge shown in Fig. 2 and to make different sized cells and cells of different configuration. It is preferred, however, to attain a ratio of cartridge depth to effective diameter of any single channel which is in excess of about 5.

In Fig. 3 there is shown a front elevation of the cylindrical cellular cartridge. This particular cartridge is made up of 15 layers of subway grating welded together, each section of subway grating being less than 1" in depth. The total depth of the cylindrical cartridge is about 1 ft. and the diameter is slightly less than 10". A less or greater number of subway grating sections may be used in fabricating each cartridge.

The cylindrical stripping vessel or section 46 shown in Fig. 1 is about 11 ft. long, the cartridges are about 1 ft. long and the spaces between the cartridges are each about ½ ft. long. In this particular construction the rectangular openings, such as opening 101, in the subway grating cartridge are about 1⅞" x 1". However, longer or shorter stripping vessels may be used, and the depth of the cellular cartridge and the dimensions of each cell may be varied as desired.

With the cylindrical stripping zone or vessel 46 shown in Fig. 1, the rate of flow of catalyst or contact particles through the stripping vessel 46 is preferably about 550 lbs./sq. ft. per minute although rates up to 1500 lbs./min./sq. ft. may be employed. The superficial velocity of the upflowing stripping gas is preferably about 1 ft./second, but may vary between 0.1 and 3 ft./sec. The stripping gas is steam, heated by the solid particles to approximately their own temperature, which may be 800–1000° F. when cracking hydrocarbons. Using the apparatus above described at 950° F. under the preferred conditions above given, the stripping efficiency was such as to reduce the transfer of combustible matter to the regenerator by from 1 to 2% on feed over results obtained at similar conditions in the absence of the cartridges. The velocity of the stripping gas passing upwardly through the cellular cartridges is slightly higher than in the unobstructed spaces because the cross-sectional area is slightly smaller than in the unobstructed spaces.

Referring now to Fig. 4 of the drawings, there is shown the bottom portion of a reaction vessel 110 with parts broken away to facilitate the disclosure. The reaction vessel 110 is provided with an inlet line 112 for introducing reactants and/or catalyst or contact particles to the reaction vessel 110. The feed line 112 is provided at its inner end with a conical member 114 arranged in the bottom portion of the reaction vessel 110 and provided with a circular horizontally extending perforated distribution member 116 concentric with the cylindrical reaction vessel 110. The distribution plate 116 is used to evenly distribute the solid particles and/or gaseous fluid across the area of the reaction vessel 110.

The velocity of the upflowing vapors or reactants is selected to maintain the catalyst or contact particles in a dense fluidized liquid-simulating condition designated at 120. The dense mixture has a level (not shown in Fig. 4) similar to that shown in Fig. 1. During conversion or other reaction, the catalyst or contact particles become contaminated with combustible material and must be regenerated before being used in another conversion operation. Before regenerating the contaminated particles, it is preferred to strip the contaminated particles to remove adsorbed and entrained vapors from the dense fluidized mixture.

The contaminated catalyst or contact particles in a dense fluidized condition are withdrawn from the dense bed or mixture 120 and passed to the upper portion of an annular stripping zone 121. This stripping zone is formed between sleeve 118 and the inner surface of the cylindrical wall of the reaction vessel 110. The sleeve 118 surrounds the conical inlet member 114 and extends above and below the distribution plate 116.

The annular stripping section 121 is provided with a plurality of cellular cartridges or inserts arranged one above the other in spaced relation. As the stripping section is annular, the separate cartridges or inserts may each be a unitary annular member and may be fitted into the annular stripping section. However, in large installations, such as commercial units, such annular members would be exceedingly large and difficult to handle, and therefore it is preferred to subdivide each annular cartridge into arcuate sections which are fitted into the annular stripping section to make the annular stripping cellular section or cartridge.

The cartridges 124, 126, 128, 132 and 134 are arranged one above the other and are separated by the spaces respectively, 136, 138, 142 and 144.

The bottom cellular cartridge 134 is supported on an annular ledge 146 which is provided on the inner wall of the reaction vessel 110 and the sleeve 118. Instead of having an annular ledge, a plurality of spaced ledges or projections may be used for supporting the bottom cellular cartridge 134. Resting on the upper face of the lowest cartridge 134 are supporting members 148 and 149 for supporting the next higher cellular cartridge 132 while at the same time spacing the cartridge from the lowermost cartridge 134. The supporting means 148 and 149 are shown as sleeves but other forms of supporting means may be used. For example, the lower face of each cartridge may be provided with pins or legs for resting on the upper face of the next lower cartridge.

From the drawing it will be seen that the spaces between the cellular cartridges are much smaller than the depth of the cartridges and that the cartridges take up most of the space in the stripping section 121. More particularly, the depth of the space 136, for example, should be about one-half the depth of the cartridge 124 or less. The cells in the cellular cartridges have a large ratio of length of cell to effective diameter of cell and most efficient stripping is obtained by contacting the stripping gas with the solid particles in a plurality of such cells. After passing through one cartridge, the solid particles are mixed with stripping gas in the unobstructed space between the cartridges to form a dense turbulent mixture for redistributing the particles in the stripping gas before passing the particles to the next lower cellular cartridge. The spaces between the cellular cartridges are provided to prevent channeling of the stripping gas through the stripping section and to insure intimate contact between the solid particles and distributing gas.

The separate cellular cartridges may be made of one piece but are preferably made by welding together stacked and aligned sections of a subway grating or other similar material as pointed out in connection with the cellular cartridges shown in Fig. 1. The separate subway grating sections are diagrammatically shown by the horizontal lines in Fig. 4.

The amount of catalyst particles to be stripped and passing through the stripping section 121, is about 200–1500 lbs./sq. ft. per minute, preferably about 550 lbs./sq. ft. per minute, and the velocity of the stripping gas is about 0.1 ft./second to 3 ft./second, preferably about 1 ft./second. The stripping gas is preferably steam or oxygen-free flue gas.

In both forms of the invention the stripping gas, in flowing upwardly through the stripping section, removes strippable material, such as hydrocarbon vapors, adsorbed on and/or entrained with the contaminated contact or catalyst particles. The stripping gas and the vapors or material stripped out of the catalyst mixture pass upwardly from the top of the stripping section into the reaction vessel and pass out with the reaction vapors from the upper part of the reaction vessel. In Fig. 1 the stripped-out material passes upwardly from the stripping section 46 into the reaction vessel 10 and out of the reaction vessel through outlet line 32. In Fig. 4 the stripped-out vapors pass upwardly from the stripping section 121 into the reaction vessel 110 from which the vapors and stripped-out material are removed from the upper part of the reaction vessel (not shown).

The action of the cellular cartridges in both forms of the invention is about the same. The operation will be more specifically described in connection with Fig. 1. Stripping gas, such as steam, is introduced below bottom cartridge 62 through pipe 48 and flows upwardly in the stripping vessel 46. The contaminated catalyst or contact particles flow down from the bottom of the reaction vessel 10 into the top portion of the stripping section 46 and the stream is first subdivided into a plurality of streams by the top cellular cartridge 52 which is preferably of a honey-comb type construction.

The cells in the cartridge 52 have a large ratio of length to effective diameter and efficient stripping is produced by subdividing the stream into a plurality of smaller streams in passing through confined passageways.

During passage of the contact particles downwardly through the cartridge 52, the particles are intimately contacted with a stripping gas passing upwardly through the cells in the cartridge 52. The particles are maintained in a liquid-like condition while passing through the cartridge and intervening spaces.

The partially stripped catalyst or contact particles then converge into a single stream in the space 72 below the cellular cartridge 52 and are further contacted with upflowing stripping gas. The particles in the space 72 are maintained in a dense turbulent fluidized condition so that extremely good mixing is obtained between the stripping gas and the solid particles and the solid particles are redistributed in the stripping gas.

The solid particles then pass down into the next lower cellular cartridge 54 wherein the single stream is again subdivided into a plurality of smaller streams which are further contacted with the upflowing stripping gas. The solid particles then pass to the next lower space 74 below the cellular cartridge 54 where they again converge into a single stream and into a fluidized dense turbulent mixture. These series of steps are repeated as the solid particles flow downwardly through the separated cellular cartridges arranged one above the other in the stripping section 46. The stripped particles are withdrawn from space 82 at the bottom of the stripping vessel 46.

While the invention has been specifically described in connection with the catalytic conversion of hydrocarbons, it is to be understood that my improved stripping process may be used in connection with other processes where it is desired to strip vapors or gaseous fluid from admixture with solid contact particles. Instead of having the stripping section directly beneath the reaction vessel, it is within the contemplation of my invention to provide a separate stripping zone so that the stripping gas and the gases or vapors stripped out of the catalyst mixture may be separately removed from the upper part of the stripping section without passing into the bottom of the reaction vessel.

My improved stripping process may be used for stripping solid particles generally, and more specifically, for stripping aromatizing catalysts used in fluid hydroforming, dehydrogenation catalysts used in fluid production of olefins and diolefins, non-catalytic contact materials employed to transfer heat in chemical reactions, oxidizing catalysts used to produce acid anhydrides by fluid processes, etc.

While I have shown several forms of my invention, it is to be understood that these are by way of example only and that various changes and modifications may be made without departing from the spirit of my invention.

What is claimed is:

1. An apparatus adapted for contacting finely divided solids with gases, said apparatus comprising in combination a vertical cylindrical shell, a narrower open-top cylinder placed concentrically within the lower part of said shell and spaced from the wall thereof to form an annulus, a plurality of cellular cartridges in said annulus each comprising a multiplicity of metal bars arranged in crisscross relation to form an open mesh grating section, several of said grating sections being stacked as a unit with the openings in aligned relation to form vertically arranged cells through each cartridge, means for supporting said cartridges one above the other in spaced relation, the depth of the spaces between said cartridges being no more than about one-half the depth of the cartridges, centrally located means for introducing solid particles and gaseous reactants near the bottom of said apparatus, means for introducing stripping gas into the lower part of said annulus below one of the lower cartridges, means for withdrawing said particles from near the bottom of said annulus, and also means for withdrawing gases from the upper part of the shell.

2. An apparatus as defined in claim 1 wherein the cellular cartridges consist of a plurality of pieces of subway grating which are secured together with the openings in aligned relationship.

3. An apparatus as defined in claim 1 wherein the cellular cartridges consist of a plurality of pieces of subway grating which are secured together with the openings in aligned relationship and the means for introducing stripping gas into the lower part of the annulus comprises a plurality of outlets for stripping gas spaced around the annulus.

HENRY J. OGORZALY.

REFERENCES CITED

The following references are of record in the file of this patent:

UNITED STATES PATENTS

| Number | Name | Date |
|---|---|---|
| 1,934,023 | Wright | Nov. 7, 1933 |
| 2,359,310 | Hemminger | Oct. 3, 1944 |
| 2,367,694 | Snuggs | Jan. 23, 1945 |
| 2,389,493 | Evans | Nov. 20, 1945 |
| 2,394,814 | Snuggs | Feb. 12, 1946 |
| 2,398,228 | Hunt | Apr. 9, 1946 |
| 2,415,756 | Le Roi et al. | Feb. 11, 1947 |
| 2,422,262 | Russell | June 17, 1947 |